(12) United States Patent
Miller et al.

(10) Patent No.: US 6,687,961 B2
(45) Date of Patent: Feb. 10, 2004

(54) HINGE PIN CONNECTOR

(75) Inventors: Daniel Miller, Auburn, WA (US); Alan Sjoboen, Puyallup, WA (US)

(73) Assignee: Tuthill Controls Group, Tacoma, WA (US)

( * ) Notice: Subject to any disclaimer, the term of this patent is extended or adjusted under 35 U.S.C. 154(b) by 0 days.

(21) Appl. No.: 10/078,410

(22) Filed: Feb. 20, 2002

(65) Prior Publication Data

US 2003/0154575 A1 Aug. 21, 2003

(51) Int. Cl.[7] ................................................. F16G 3/02
(52) U.S. Cl. ...................... 24/33 P; 198/844.2; 474/253
(58) Field of Search ............................... 24/31 R, 33 R, 24/33 P, 34, 31 H, 33 M, 33 C, 33 B; 198/844.1, 844.2, 853, 851; 474/253, 255, 257, 221, 218; 16/225, 273

(56) References Cited

U.S. PATENT DOCUMENTS

| | | | | |
|---|---|---|---|---|
| 1,555,214 A | * | 9/1925 | Johnson | 24/33 P |
| 3,319,217 A | * | 5/1967 | Phillips | 24/33 P |
| 4,024,605 A | * | 5/1977 | Henke | 24/33 P |
| 4,671,403 A | * | 6/1987 | Schick | 198/844.2 |
| 4,671,694 A | * | 6/1987 | Brenner et al. | 403/226 |
| 5,038,442 A | * | 8/1991 | Stolz et al. | 24/33 P |
| 5,884,369 A | * | 3/1999 | Schick et al. | 24/33 P |

\* cited by examiner

*Primary Examiner*—Robert J. Sandy
(74) *Attorney, Agent, or Firm*—Christensen O'Connor Johnson Kindness PLLC

(57) ABSTRACT

A hinge pin connector (20) is provided. The hinge pin connector includes a first load bearing component (32) having a perimeter and a second load bearing component (36) disposed around the first load bearing component. The hinge pin connector also includes a first boundary layer (34) disposed between the first and second bearing components to substantially surround the perimeter of the first load bearing component.

9 Claims, 1 Drawing Sheet

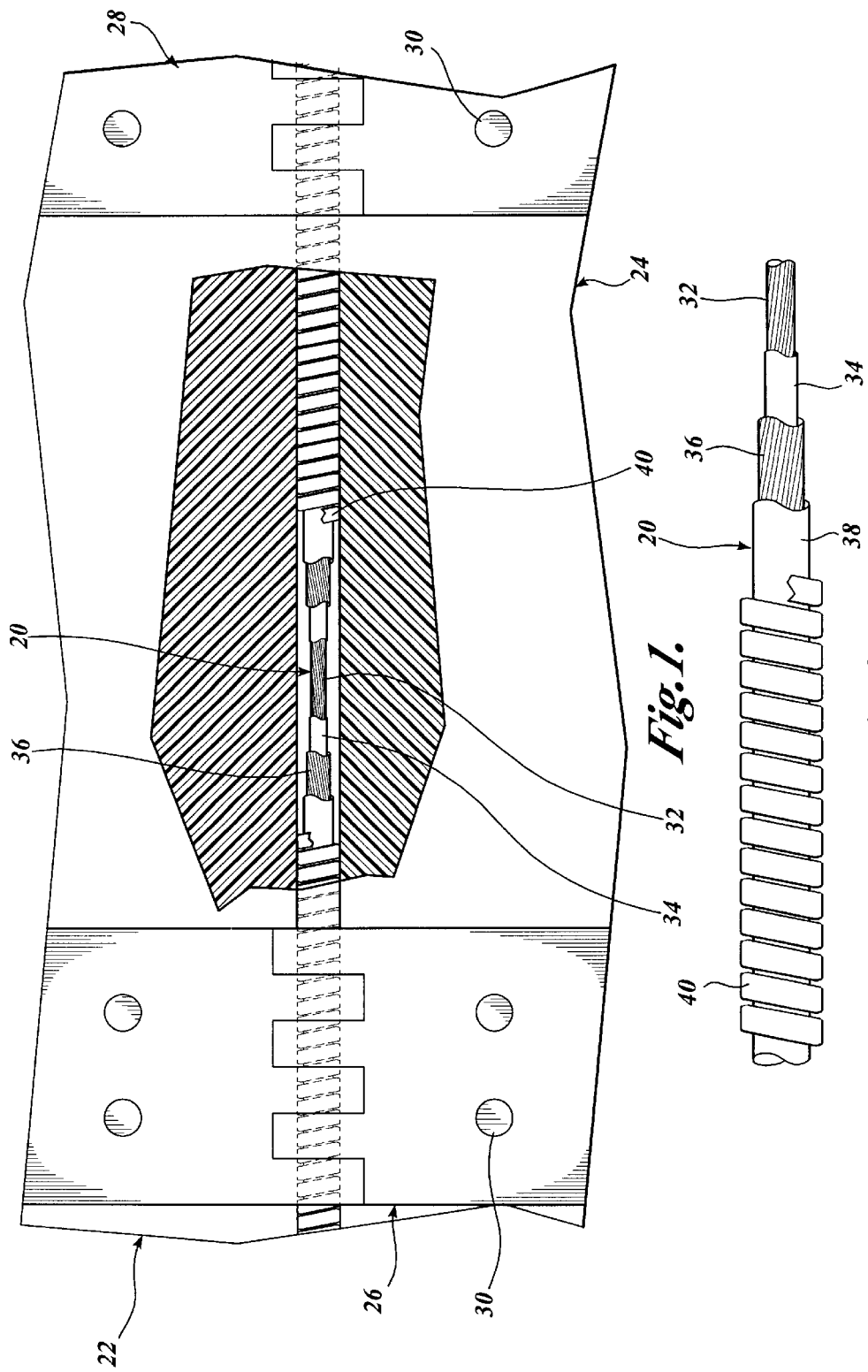

HINGE PIN CONNECTOR

FIELD OF THE INVENTION

This invention relates generally to flexible belting systems and, more particularly, to a flexible hinge pin for conveyors equipment.

BACKGROUND OF THE INVENTION

A common mode of transporting bulk raw materials, such as coal or grain, is accomplished through the use of a flexible belting apparatus. When used to convey or transport bulk materials, such an apparatus typically includes a single belt or a number of conveyor belt sections supported and riding on a frame. When multiple belt sections are joined together, they can be joined by a hinge and pin connection. Conveyor belts may be miles long.

Hinge pin connectors for such a conveyor apparatus typically include a plurality of wire strands encased within a second layer of wire strands. The hinge pin connector extends through hinges attached to opposing ends of adjacent conveyor belt sections to perform the necessary connection. As attached, a plurality of conveyor belt sections are interconnected and thus form a continuous conveyor belt to transport raw materials.

In operation, tons of bulk raw material are transported on the conveyor belt. During the transportation of the bulk raw material, the hinge pin connector is subjected to large shear and fatigue loads repeated during the cycle of operation. Such repeated loads often result in premature failure of the hinge pin connector due to gauling between the layers of wire strands or simply overload. Corrosion also affects the life of the pin. As corrosion increases, load capacity decreases. When a hinge pin connector fails, the operator of the flexible belting apparatus must shut down the operation until the failed pin can be found and replaced, resulting in lost revenue.

Thus, there exists a need for an improved hinge pin connector having an increased useful life.

SUMMARY OF THE INVENTION

One embodiment of the present invention is generally directed to a hinge pin connector that includes a first load bearing component having a perimeter. A second load bearing component is disposed around the perimeter of the first load bearing component. This embodiment also includes a first boundary layer disposed between the first and second load bearing components. In one aspect of the present embodiment, the first boundary layer serves to reduce friction between the first and second load bearing components and delay onset of corrosion and/or minimize contact between the first and second load bearing component.

In another aspect of the present embodiment, the hinge pin connector includes a second boundary layer disposed around the second load bearing component to substantially seal the first and second load bearing components from environmental contaminants and contact.

In yet another aspect of the present embodiment, the first boundary layer is formed from a plastic. In still yet another aspect of the present embodiment, the second boundary layer is formed from a plastic.

In another embodiment of the present invention, the first boundary layer is formed from a low-density polyurethane, and the second boundary layer is Nylon. In yet another embodiment of the present invention, a flattened wire strand is wrapped around the second boundary layer, thereby distributing wear and load.

BRIEF DESCRIPTION OF THE DRAWINGS

The foregoing aspects and many of the attendant advantages of this invention will become better understood by reference to the following detailed description, when taken in conjunction with the accompanying drawings, wherein:

FIG. 1 is a planar top view of a hinge pin connector formed in accordance with one embodiment of the present invention as it would be used to connect adjacent components of a conveyor belt; and FIG. 2 is a planar view of a hinge pin connector formed in accordance with one embodiment of the present invention with layers removed for clarity.

DETAILED DESCRIPTION OF THE PREFERRED EMBODIMENT

FIG. 1 illustrates a hinge connector 20 formed in accordance with one embodiment of the present invention. The hinge connector 20 is suitable to connect adjacent first and second conveyor belt sections 22 and 24 of a flexible conveyor belt assembly (not shown). The hinge connector 20 extends between opposing ends of the first and second conveyor belt sections 22 and 24 and through well known hinges 26 and 28. The hinges 26 and 28 are fastened to the conveyor belt sections 22 and 24 in a well-known manner using various fasteners 30.

As may be best seen by referring to FIG. 2, the hinge connector 20 includes a first load bearing component 32, a first boundary layer 34, a second load bearing component 36, and a second boundary layer 38. The first load bearing component 32 is suitably a plurality of stainless steel wire strands wrapped around a centrally located and longitudinally extending axis (not shown). Although the first load bearing component 32 is suitably a plurality of wrapped wire strands, it should be apparent that other embodiments, such as a solid metallic and/or non-metallic core, are also within the scope of the present invention.

The first boundary layer 34 is suitably formed from, but is not limited to, a low-density polyurethane extrusion and substantially encases the first load bearing component 32. One such suitable material used to form the first boundary layer 34 is Nylon®. The first boundary layer 34 extends substantially the length of the first load bearing component 32. Although it is preferred that the first boundary layer 34 be formed from a polyurethane extrusion, other non-metallic, polymeric materials are also within the scope of the present invention.

The first boundary layer 34 functions as a layer of isolation, such that when loads are applied to the hinge connector 20, the first boundary layer 34 isolates the adjacent first boundary layer 34 and second load bearing component 36. This isolation reduces gauling and increases life expectancy under cyclic loading, i.e., fatigue. The first boundary layer 34 also substantially seals the first load bearing component 32 from corrosive substances usually found in industries using flexible belting systems. Thus, as used within the meaning of this description, the term "seal" is intended to mean that the first boundary layer 34 substantially reduces penetration of corrosive substances and, therefore, delays corrosion of the first load bearing component 32.

The second load bearing component 36 is suitably formed from a plurality of stainless steel wire strands, as described above for the first load bearing component 32. The second load bearing component 36 substantially surrounds the perimeter of the first boundary layer 34 and is applied as required to achieve necessary cross-sectional strength. Although the second load bearing component 36 is suitably a plurality of wire strands, the present invention is not intended to be so limited. Accordingly, it should be apparent to one of ordinary skill that other embodiments of forming the second load bearing component 36, such as solid metallic and/or non-metallic cores, are also within the scope of the present invention.

The second boundary layer 38 substantially encases the second load bearing component 36 and, in certain embodiments, is an optional element of the connector pin 20. The second boundary layer 38 is suitably formed from a plastic material, such as Zytel® 450HSL black, manufactured and sold by Du Pont Corporation or Nylon®. Although the second boundary layer 38 is preferred, and as noted above, other hinge connectors, such as those formed with only one boundary layer, are also within the scope of the present invention.

It should be apparent that, depending upon the cross-sectional strength required for a particular use, a hinge connector having additional load bearing component layers and/or boundary layers, are also within the scope of the present invention. As a non-limiting example, a hinge connector may include a third load bearing component substantially encasing the second boundary layer, thereby increasing the cross-sectional strength of such a hinge connector. Thus, a hinge connector having multiple load bearing layers and boundary layers are within the scope of the present invention.

Still referring to FIG. 2, the hinge connector 20 also includes a jacket 40. The jacket 40 is suitably formed from a stainless steel flattened wire, wrapped on the outside of the second boundary layer 38. The jacket 40 acts as a wear surface and distributes shear load created by the hinge itself. Although it is preferred that a hinge connector 20 includes a jacket 40, it should be apparent that a hinge connector formed without a jacket 40 is also within the scope of the present invention.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A pin connector, comprising:
   (a) a first load bearing component having a perimeter;
   (b) a second load bearing component disposed around the perimeter of the first load bearing component; and
   (c) a first boundary layer disposed between the first and second bearing components to substantially surround the perimeter of the first load bearing component, wherein at least one of the first or second bearing components is a plurality of wire strands, further comprising a second boundary layer disposed around the second load bearing component, wherein the first and second boundary layers are non-metallic, further comprising a strand of wire wound around the second boundary layer to distribute shear load associated with use of the hinge pin connector.

2. A hinge pin connector, comprising:
   (a) a first plurality of load bearing components having a perimeter;
   (b) a second load bearing component disposed around the perimeter of the first plurality of load bearing components; and
   (c) a first boundary layer disposed between the first plurality of load bearing components and the second load bearing component to substantially surround the perimeter of the first plurality of load bearing components and reduce corrosion between the first plurality of load bearing components and the second load bearing component, further comprising a second boundary layer disposed around the second load bearing component, further comprising a strand of wire disposed around the second boundary layer.

3. The hinge pin connector of claim 2, wherein the first boundary layer substantially seals the first plurality of load bearing components from corrosive substances associated with use of the hinge pin.

4. The hinge pin connector of claim 2, wherein the first plurality of load bearing components and the second load bearing component are a plurality of wire strands.

5. A hinge pin connector, comprising:
   (a) a first load bearing component having a perimeter;
   (b) a first boundary layer disposed around the perimeter of the first load bearing component;
   (c) a second load bearing component disposed around the first boundary layer; and
   (d) a second boundary layer disposed around the second load bearing component, further comprising a strand of flattened wire disposed around the second boundary layer.

6. A hinge pin connector, comprising:
   (a) a first plurality of wire strands, the first plurality of wire strands having a perimeter;
   (b) a non-metallic first boundary layer substantially surrounding and sealing the first plurality of wire strands; and
   (c) a second plurality of wire strands disposed around the first boundary layer, further comprising a jacket disposed around the second plurality of wire strands to distribute at least a portion of shear loads associated with use of the hinge pin, further comprising a second boundary layer disposed between the second plurality of wire strands and the jacket.

7. The hinge pin connector of claim 6, wherein the second boundary layer is formed from a non-metallic material.

8. A hinge pin connector, comprising:
   (a) a first load bearing component having a perimeter;
   (b) a first boundary layer disposed around the perimeter of the first load bearing component;
   (c) a second load bearing component disposed around the first boundary layer; and
   (d) a second boundary layer disposed around the second load bearing component, wherein the first boundary layer is formed from a non-metallic material.

9. A hinge pin connector, comprising:
   (a) a first load bearing component having a perimeter;
   (b) a first boundary layer disposed around the perimeter of the first load bearing component;
   (c) a second load bearing component disposed around the first boundary layer; and
   (d) a second boundary layer disposed around the second load bearing component, wherein the second boundary layer is formed from a non-metallic material.

* * * * *